United States Patent [19]
Paoletti

[11] 4,192,983
[45] Mar. 11, 1980

[54] METHODS OF HARD FACING
[75] Inventor: Alfred J. Paoletti, Willingboro, N.J.
[73] Assignee: Cabot Corporation, Kokomo, Ind.
[21] Appl. No.: 902,069
[22] Filed: May 2, 1978
[51] Int. Cl.² ............................................. B23K 35/30
[52] U.S. Cl. .................................. 219/76.1; 219/146.1; 219/146.23
[58] Field of Search ...................... 219/76.1, 77, 145.1, 219/146.1, 145.23, 146.23

[56] References Cited
U.S. PATENT DOCUMENTS

| 2,024,992 | 12/1935 | Wissler | 219/146.1 |
| 2,030,342 | 2/1936 | Wissler | 219/77 |
| 2,050,043 | 8/1936 | Golyer | 219/146.1 X |
| 2,280,223 | 4/1942 | Dumpelmann | 219/146.1 |
| 2,292,694 | 8/1942 | Jerabek | 219/77 X |
| 2,613,304 | 10/1952 | Colinet | 219/145.1 X |
| 2,817,751 | 12/1957 | Phillips | 219/145.1 X |

FOREIGN PATENT DOCUMENTS 728762  4/1955  United Kingdom ............... 219/146.41

Primary Examiner—Richard R. Kucia
Attorney, Agent, or Firm—Jack Schuman; Joseph J. Phillips

[57] ABSTRACT

A method of forming a hard surfacing on a metal article is provided based upon forming a weld wire with a diffusion layer containing boron and depositing the wire on the surface to be hard surfaced by means of an electric arc to form a substantially uniform boron containing alloy weldment composition.

6 Claims, 6 Drawing Figures

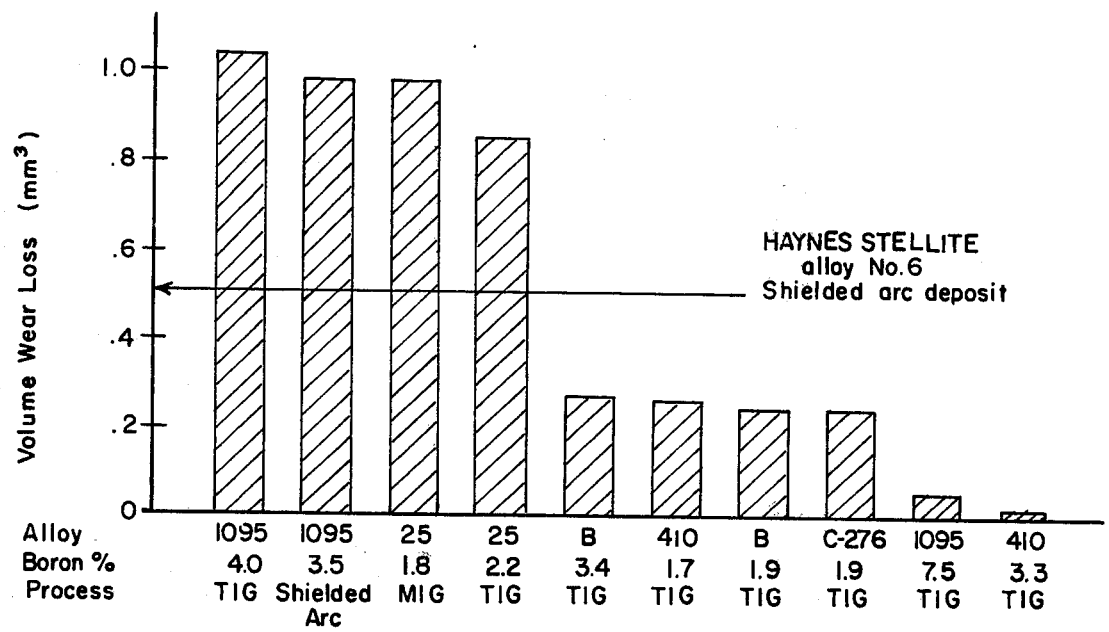
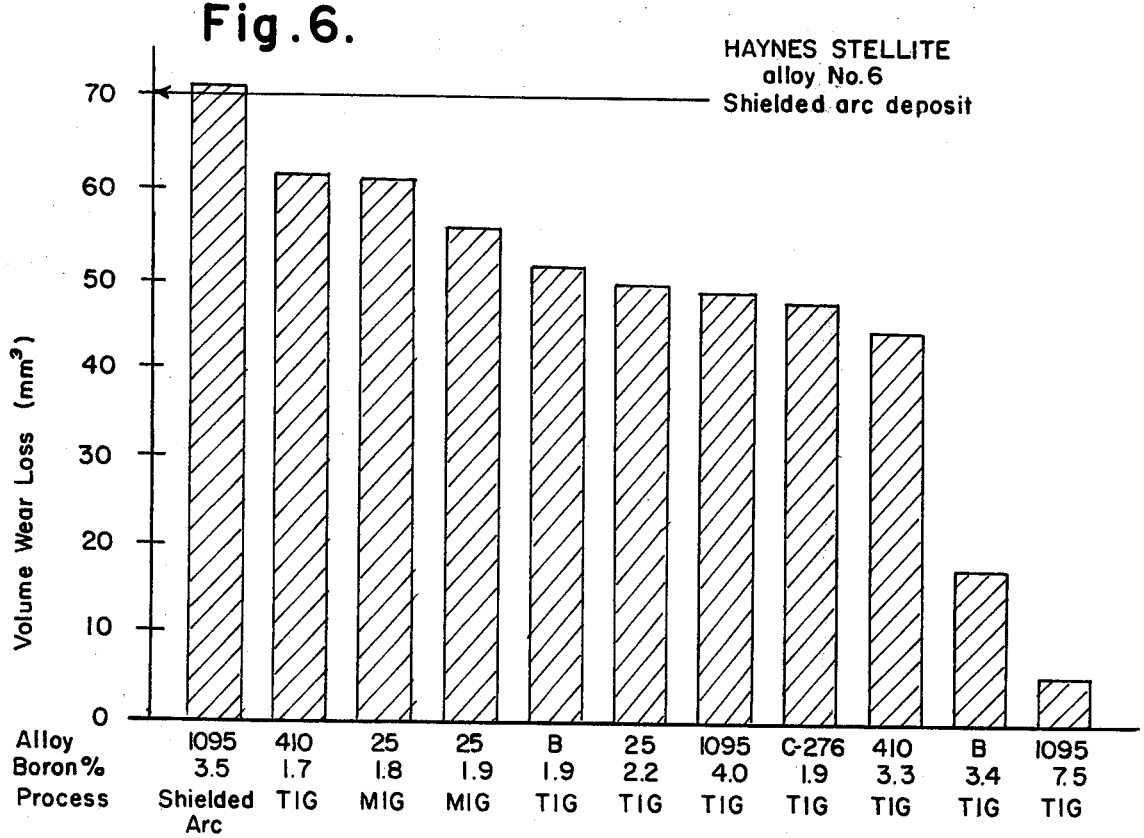

METHODS OF HARD FACING

This invention relates to methods of hard facing and particularly to boron coated welding rod and wire and to a method of hard facing by depositing a boron composition from said welding rod or wire onto a metal surface to be hard faced.

Hard facing of metal surfaces to provide greater wear resistance is well known. Hard facing has been generally accomplished by applying a hard metal layer onto a surface to be protected as by welding techniques or diffusion techniques. For example, it has been long the practice to apply a layer of STELLITE* alloy on plow shares, grader blades, highlift bucket teeth, automotive valves, etc., by welding techniques which involved melting an electrode of the metal onto the surface to be hard faced. It has also been known to harden a surface by boron diffusion techniques in which the part to be hard faced is treated with a boriding composition by packing the article in such composition and heating to elevated temperature in a furnace. Such compositions and practices are described in U.S. Pat. No. 2,849,336 and British Pat. Nos. 1,436,945, 193,917 and 193,918. These practices require extended periods of time at elevated temperatures in furnace structures. They are expensive and completely unsuited to many articles, particularly articles which must be hard faced in the field. Another method of boride coating a cutting edge involves radio frequency sputtering or chemical vapor deposition of boride on a surface as shown in U.S. Pat. No. 3,960,608. This practice also is expensive, requires large reaction chambers and is totally unsuited to field applications.
*Trademark of Cabot Corporation I have invented a method of boron hard facing which is simple in application, can be field applied and is relatively cost competitive. Moreover, the method of my invention differs markedly from the prior art boron processes in that complete alloying of the boron in the surface occurs at the time of weld deposition and the thickness of the hardened surface can be much greater, and generally is much greater than that achieved by any of the prior art boride surfacing processes.

In the practice of this invention I use a metallic welding wire or rod having boron diffused into the surface thereof in an amount between about 0.5% and 8% of the total weight of the wire or rod and a hard surface coating on an article made by depositing said rod or wire as a fully alloyed weld layer or weldment of selected thickness on said surface. The boron in the weld wire or rod is diffused into only the surface of the wire or rod but, on application as a weld layer or weldment, it becomes fully alloyed into the weldment. Preferably, the weld wire is made from an iron, nickel or cobalt base alloy such as mild steel, HASTELLOY* alloy B, HAYNES* alloy No. 25, C-276*, and the like. The rod or wire of this invention may be applied by tungsten inert gas (TIG) techniques, by metal inert gas (MIG) techniques or by shielded metal arc techniques. In the case of shielded metal arc, a conventional mineral extrusion coating formulation providing the necessary shielding and covering slag may be extruded around the core wire as in the manufacture of any shielded arc electrode rod. Preferably the wire used in this invention is subjected to a boron diffusion process which converts the surface layer of the metal to a layer of metal borides, for example iron is converted to iron borides ($2Fe + B = Fe_2B$). The diffusion process is carried out until the desired level of boron in the rod has been achieved. At high levels of boron, the surface of the wire or rod becomes brittle and tends to spall and the wire or rod must be handled with care and sharp bends avoided, precisely as is the case with any coating welded electrode. The hard faced article which results from the process of this invention contains the boron as a fully alloyed ingredient for the full depth of the weldment. Thus the depth of the hard surfacing applied may be varied greatly simply by varying the amount of weld material applied. Thus the surface is not limited by a small depth of practical penetration which can be obtained by prior art boron diffusion techniques and is not subject to the problems of extreme brittleness which characterize prior art boron diffusion surfaces.
*Trademark of Cabot Corporation In the foregoing general description of this invention certain objects, purposes and advantages have been set out.

Other objects, purposes and advantages of this invention will be apparent from a consideration of the following description and examples and from the drawings in which:

FIG. 5 is a graph showing the adhesive (metal to metal) wear resistance of articles surfaced according to this invention compared with a like article coated with HAYNES STELLITE* alloy No. 6, a conventional hard facing coating.

Figure 1:
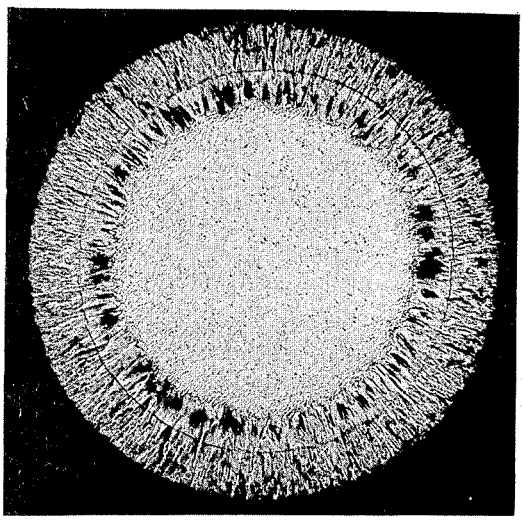
FIG. 1 is a metallographic cross section of a boron coated 1/16" wire of 1095 steel with 7.5% boron.
Figure 2:
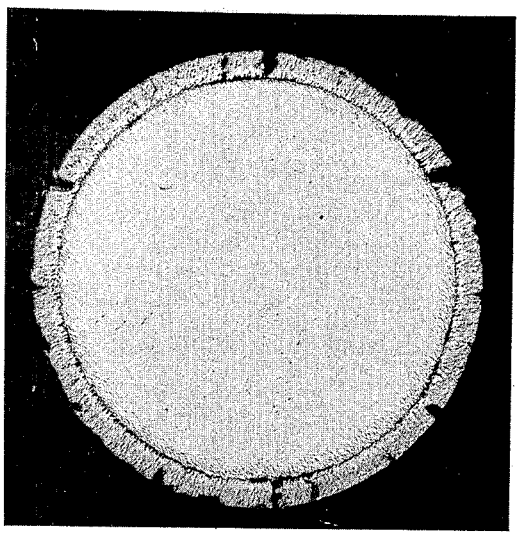
FIG. 2 is a metallographic cross section of a 1/16" diameter wire of HASTELLOY* alloy B containing 3.4% boron.
Figure 3:
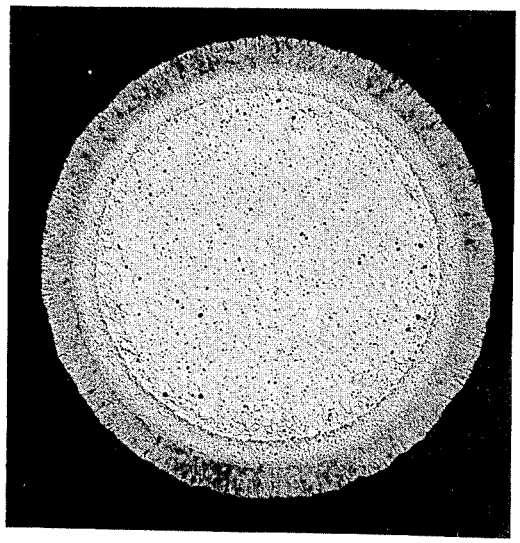
FIG. 3 is a metallographic cross section of a 1/16" diameter wire of 410 stainless steel with 3.3% boron.
Figure 4:
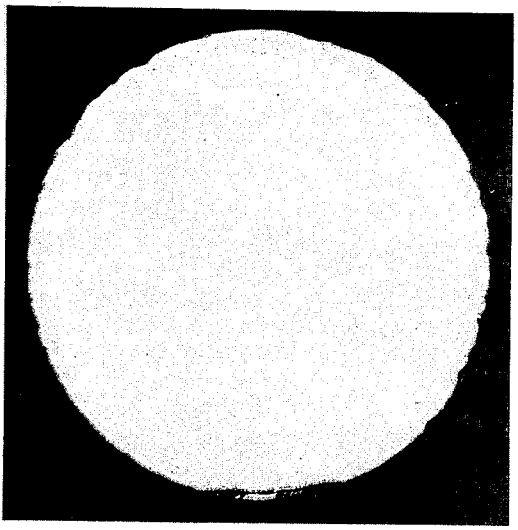
FIG. 4 is a metallographic cross section of a 1/16" diameter wire of HAYNES* alloy No. 25 with 2.2% boron.
*Trademark of Cabot Corporation

FIG. 6 is a graph showing the abrasive wear resistance of articles surfaced according to this invention compared with a like article coated with HAYNES STELLITE* alloy No. 6.
*Trademark of Cabot Corporation Referring to the drawings there is illustrated in FIGS. 1 through 4 metallographic cross sections of boron coated 1/16" nominal diameter wire 10, magnified 50X, of different compositions and different boron coating 11 levels. As can be seen from the drawings the coating 11 which is basically metal borides, is highly porous. The coated wires of FIGS. 1 through 4 were made by placing the wire in a boriding pack (e.g., ferro-boron or boron carbide, an activator and an inert diluent) and heating to a temperature and holding the same (e.g., 900° C.) until a desired diffusion of boron has occurred into the wire surface. Any known boriding technique can be used to produce the boron diffusion in the wire.

Example I

A variety of electrodes of 1/16" wire, except as otherwise noted, were treated in a boriding pack at elevated temperatures to produce a variety of different levels of boron coatings in a finished nominal 1/16" electrode. These electrodes were as set out in Table I:

Table I.

| Electrode Composition | Amount of Diffused Boron |
|---|---|
| 1095 Steel | 4.0% |

Table I.-continued

| Electrode Composition | Amount of Diffused Boron |
|---|---|
| 1095 Steel (⅛" wire) | 3.6% |
| 1095 Steel | 7.5% |
| HAYNES* Alloy No. 25 (0.040" wire) | 1.8% |
| HAYNES* Alloy No. 25 | 2.2% |
| HASTELLOY* Alloy B | 3.4% |
| HASTELLOY* Alloy B | 1.9% |
| 410 Stainless Steel | 1.7% |
| 410 Stainless Steel | 3.3% |
| HASTELLOY* Alloy C-276* | 1.9% |

The electrodes from Table I were used to apply a two-layer hard facing surface of at least two layers to a ½ inch steel coupon by either of TIG, MIG, or shielded arc techniques. Each of the weldment surfaces were subject to adhesive (metal-to-metal) wear resistance tests and compared with a like adhesive wear resistance test on a HAYNES STELLITE* Alloy No. 6 weldment deposit. The results of those tests appear in FIG. 5. From that data it will be seen that six of the specimens made according to this invention are far below HAYNES STELLITE* Alloy No. 6 in volume wear loss.
*Trademark of Cabot Corporation Example II Another set of 1/16" electrodes, except as noted, made in the same way as those of Example I are set out in Table II:

Table II.

| Electrode Composition | Amount of Diffused Boron |
|---|---|
| 1095 Steel | 4.0% |
| 1095 Steel | 7.5% |
| 1095 Steel (⅛" wire) | 3.6% |
| 410 Stainless Steel | 1.7% |
| 410 Stainless Steel | 3.3% |
| HAYNES* Alloy No. 25(0.040"wire) | 1.8% |
| HAYNES* Alloy No. 25(0.040"wire) | 1.9% |
| HAYNES* Alloy No. 25 | 2.2% |
| HASTELLOY* Alloy B | 1.9% |
| HASTELLOY* Alloy B | 3.4% |
| HASTELLOY* Alloy C-276* | 1.9% |

The electrodes from Table II were used to apply at least a single layer hard facing surface to a ½" steel coupon by each of TIG,, MIG,, and shielded arc techniques. Each of the resulting weldment surfaces were subject to the same conventional abrasion wear test and compared with a like abrasion wear test on a HAYNES STELLITE* alloy No. 6 weldment deposit. The results of these tests appear in FIG. 6. From those tests it is apparent that all of the test pieces are equal or superior to the hard facing produced by HAYNES STELLITE* Alloy No. 6 in resistance to abrasion loss. HAYNES STELLITE* Alloy No. 6 is conventionally used as a hard facing electrode for wear resistant applications and is one of the better known and most often used electrodes for that purpose.
*Trademark of Cabot Corporation Metallographic tests of the weldments made according to this invention show that the electrodes of this invention, when made into weldments, change into fully alloyed metals on the surface of the article being hard surfaced.

As can be seen from the foregoing Examples, weldments made by this invention using any of the conventional TIG, MIG or shielded arc techniques will exhibit the desired hard surfacing (abrasion resistant) character, providing sufficient boron is present in the coating formed by diffusion conversion of the outer surface of the electrode wire or rod.

Example III

In order to determine the effective depth of penetration of boron into the wire surface at different boron concentrations, measurements were made before and after the boronising treatment. The results are tabulated in Table III.

Table III.

| Wire | % Boron | Original Diameter | Final Diameter | FeB Skin | Volume FeB |
|---|---|---|---|---|---|
| 3/32" Steel | 2% | 0.09375 | 0.09525 | 0.0033 | 13% |
| 3/32" Steel | 4% | 0.09375 | 0.09654 | 0.0055 | 21% |
| 3/32" Steel | 6% | 0.09375 | 0.09793 | 0.0084 | 46% |
| 3/32" Nickel | 2% | 0.09375 | 0.0954 | 0.0031 | 12% |
| 3/32" Nickel | 4% | 0.09375 | 0.0975 | 0.0062 | — |
| 3/32" Nickel | 6% | 0.09375 | 0.0994 | 0.0095 | — |

The unaffected wire diameter, in the case of 3/32" steel wire with 2% boron, was determined to be 0.0888 inch. It is thus clear that as the boron reacts with the surface there is a penetration into the metal and an enlarging of the wire. The effect can be clearly seen in FIGS. 1-4.

Example IV

A two layer weldment on a ½ inch steel coupon was made by MIG welding using a HAYNES* alloy No. 25 electrode with a boron containing coating of 1.8% boron was sectioned and a microhardness profile made. This appears in Table IV.
*Trademark of Cabot Corporation Table IV.

| 500 Gram Indentation | Location | Filiar Units | DPH | Rockwell |
|---|---|---|---|---|
| 1 | Top-Near Surface | 212 | 518 | Rc 50 |
| 2 | | 212 | 518 | Rc 50 |
| 3 | | 212 | 518 | Rc 50 |
| 4 | | 212 | 518 | Rc 50 |
| 5 | | 212 | 518 | Rc 50 |
| 6 | Middle | 212 | 518 | Rc 50 |
| 7 | | 212 | 518 | Rc 50 |
| 8 | | 215 | 504 | Rc 49 |
| 9 | | 215 | 504 | Rc 49 |
| 10 | | 215 | 504 | Rc 49 |
| 11 | Bottom-Near Bond Line | 234 | 425 | Rc 43 |
| 12 | Steel | 370 | 170 | Rb 85 |

In the foregoing specification certain preferred practices and embodiments of this invention have been set out, however, it will be understood that this invention may be otherwise embodied within the scope of the following claims.

I claim:
1. A method of hard surfacing a metal article comprising the steps of:
   a. forming a metal boride layer in situ on an electrode wire; and
   b. forming at least one layer of weldment on a surface of an article to be coated by depositing said electrode wire onto said surface by a welding technique simultaneously to melt the wire and metal boride into an alloy coating of substantially uniform boron containing composition and fuse the same to said surface.
2. The method as claimed in claim 1 wherein the boron containing coating is formed by diffusing boron into the surface of the electrode wire.

3. The method as claimed in claim 1 wherein the boron containing coating includes about 0.5% to 8% boron on the wire weight.

4. The method as claimed in claim 1 wherein the wire is steel.

5. The method as claimed in claim 1 wherein the wire is a nickel base alloy.

6. The method as claimed in claim 1 wherein the wire is a cobalt-base alloy.